Sept. 14, 1948.   J. A. HOPWOOD   2,449,229
MILK DELIVERY TUBE
Filed July 7, 1945
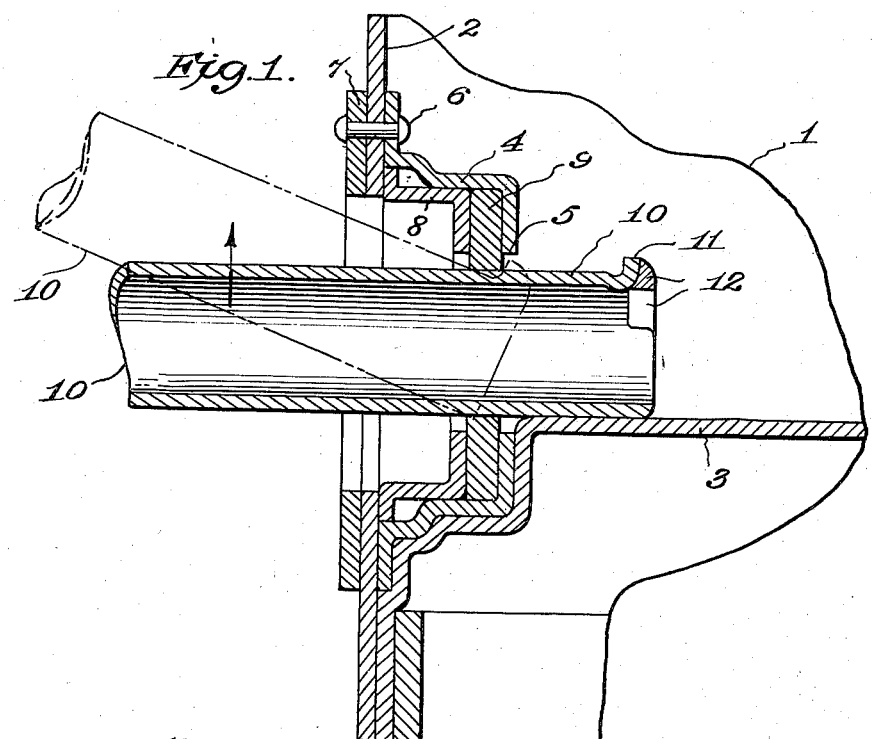
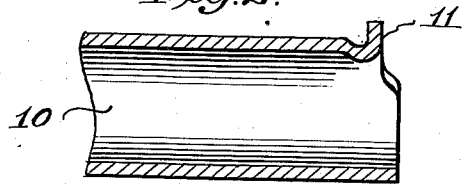
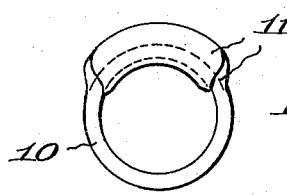
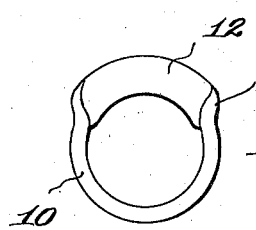
INVENTOR.
JOHN A. HOPWOOD
BY Cornelius Zaluski
ATTORNEY Patented Sept. 14, 1948

2,449,229

UNITED STATES PATENT OFFICE 2,449,229

MILK DELIVERY TUBE

John A. Hopwood, Westfield, N. J., assignor to Monitor Process Corporation, Jersey City, N. J., a corporation of New Jersey Application July 7, 1945, Serial No. 603,677

2 Claims. (Cl. 138—47)

This invention is a milk delivery tube for use with side delivery cans of the character illustrated in U. S. Patents of William Tamminga, Nos. 2,186,082 and 2,186,083, issued January 9, 1940. In these patents milk is adapted to be dispensed through the wall of a can by way of a delivery tube which is slidable through an outlet fitting in said wall. Said outlet fitting is provided therein with an appropriate gasket which precludes leakage around the tube.

In constructions of this kind it is essential that the tube be removable in order that it may be thoroughly cleaned and sterilized. Heretofore it has been the practice to provide the inner end of the tube with a so called "stop pin" which normally limits the outer movement of the tube so as to preclude it from being inadvertently withdrawn entirely from the fitting. This pin, however, must be so placed that, when the tube is sharply tilted in an upward direction, it will permit the tube to be withdrawn from the fitting for cleaning and sterilizing purposes. The pins heretofore used have simply been riveted through the wall of the tube adjacent to the inner end thereof and the structure has generally been inherently weak. Breakage of these pins has thus been quite a common occurrence and is particularly undesirable, not only from the standpoint of required replacement parts, but due to the fact that whenever such an accident happened the entire contents of the milk can was discharged upon the floor.

The object of the present invention is to eliminate this defect and to provide milk delivery tubes so formed that breakage or inadvertent release thereof are practically impossible.

Speaking generally, this invention consists in flaring the inner end of the outlet tube in a radial direction to provide an arcuate flange extending about ¼ to ⅓ of the circumference of the tube and preferably backed up by a mass of solder or welding metal in a manner to thoroughly reinforce and strengthen the same. The tube may be formed in the manner stated in a simple, economical and expeditious way and the resulting structure is thoroughly efficient, strong and dependable.

Features of the invention other than those specified will be apparent from the following detailed discussion when read in conjunction with the accompanying drawings.

In the accompanying drawings I have illustrated the preferred practical improvement of the invention but the structure therein shown is to be understood as illustrative only and not as defining the limits of the invention.

In said drawings:

Figure 1 is a fragmental vertical section through the outlet of a side delivery milk can, showing a dispensing tube embodying the present invention.

Figure 2 shows the inner end portion of the tube, detached from the can and illustrating the first step in forming an arcuate stop flange at inner end of said tube.

Figure 3 is an end elevation of the tube as shown in Figure 2.

Figure 4 is a central section of the tube after the segmental flange has been backed up with solder.

Figure 5 is an end elevation of the tube as shown in Figure 4.

Figure 6 is a side elevation of the tube shown in Figure 4.

Referring to Figure 1 of the drawings, I designates a milk delivery can provided with a side wall 2 and having a bottom 3. The side wall 2 has an opening somewhat larger than the delivery tube to be used and in this opening is mounted a cup which has a central opening 5 also somewhat larger than the tube. The cup is secured to the wall of the can by rivets 6 which pass through said wall and also through a reinforcing ring 7 on the exterior of the wall. This reinforcing ring also has a central opening through which a pressure member 8 may be passed in order to clamp an elastic gasket 9 against the base of the cup. This elastic gasket 9 is so proportioned that it will have a sliding fit with the outer surface of the cylindrical dispensing tube 10. For a more detailed showing of this structure reference may be had to Patent No. 2,186,083 hereinbefore referred to or Hopwood Patents Nos. 2,292,836 or 2,354,995. The dispensing tube 10 is, except for its inner end, made according to the disclosure of said patents so that the illustration of the entire length of such tube is not necessary here.

In incorporating the present invention in the delivery tube of the character described, I start with a straight cylindrical tubular section, the inner end of which is cut off flush. The first step consists in manipulating approximately ⅓ to ¼ of the circumference of the inner edge of the tube, by suitable dies or offsetting mechanism, to flare or turn back that portion of the tube, as shown in Figures 2 and 3 of the drawings, to provide an arcuate radial flange 11. This flange preferably extends about ⅓ of the circumference of the tube and projects radially outward from said tube in a cross-axial plane. The body of the tube may be indented slightly at the base of the flange, but this nominal distortion will not interfere with the proper functioning of the tube.

The tubes employed are generally quite thin and, in order to give the resulting flange sufficient strength under all conditions, the flange 11 is backed up by a mass 12 of solder or welding metal (these being considered as equivalent) shown in Figures 4 and 5, wherein the solder is shown as built out to substantially the end of the tube to give a strong reinforcing backing to the flange. When this has been done the flange will be sufficiently rugged to withstand all ordinary uses. The resulting finished structure is shown in Figures 4, 5 and 6.

The tube may be introduced into the fitting of the can by tilting it upwardly into the dot and dash line position shown in Figure 1 so that the flange may be passed through the opening of the gasket and beyond the same. If the tube is then swung downwardly into horizontal position it may readily be slid into the can to function in the usual manner. To remove the tube the operations described are reversed.

Practical experience has shown that the tube of this invention is highly efficient for the purpose as stated. By forming the arcuate flange so as to extend for less than ½ of the circumference of the tube, a structure is produced which may be readily inserted and removed from the fitting when desired, but which when made of a length to extend at least ¼ of the circumference will be sufficiently strong so that it will not be broken or sheared off when forcibly withdrawn during normal handling.

The foregoing detailed description sets forth the invention in its preferred practical form, but this invention is to be understood as fully commensurate with the appended claims.

Having thus described my invention what I claim is new and desire to secure by Letters Patent is:

1. A milk delivery tube the inner end of which is flared to provide a radially projecting arcuate flange extending about substantially ¼ to ⅓ the circumference of the tube.

2. A milk delivery tube the inner end of which is flared to provide a radially projecting arcuate flange extending about substantially ¼ to ⅓ the circumference of the tube, said flange being backed up with a mass of solder to reinforce said flange.

JOHN A. HOPWOOD.

REFERENCES CITED

The following references are of record in the file of this patent:

UNITED STATES PATENTS

| Number | Name | Date |
| --- | --- | --- |
| 2,292,836 | Hopwood | Aug. 11, 1942 |
| 2,332,355 | Stecher | Oct. 19, 1943 |